May 8, 1956      J. D. PIGFORD      2,744,420
CABLE SLACK COMPENSATOR
Filed July 11, 1952
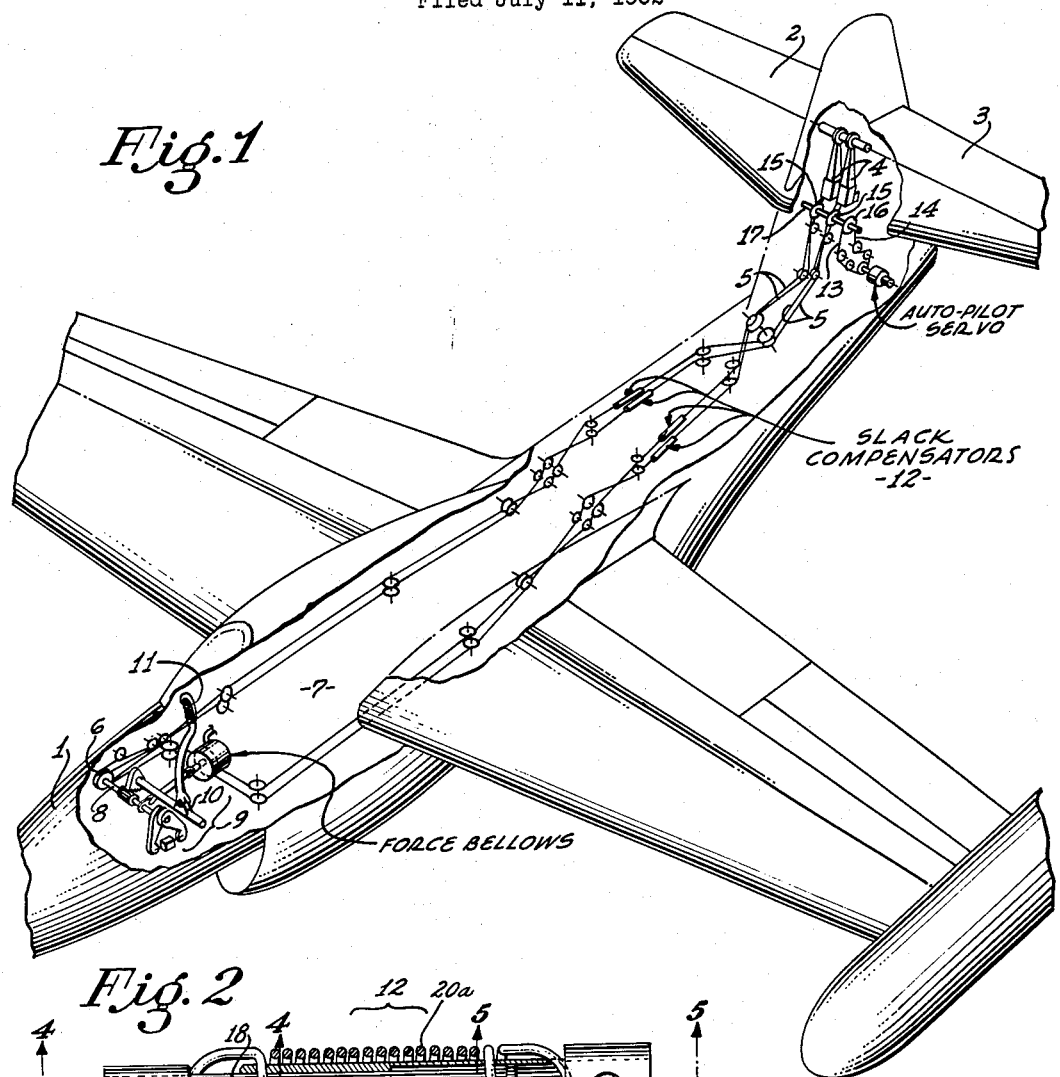
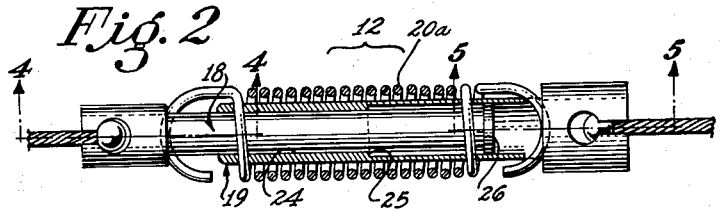
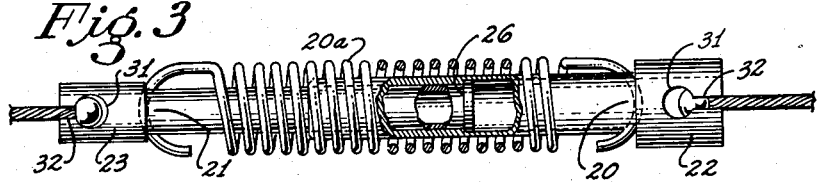
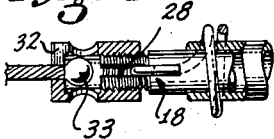
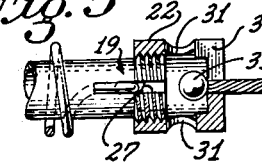
INVENTOR:
JOHN D. PIGFORD
HIS PATENT ATTORNEY United States Patent Office 2,744,420
Patented May 8, 1956

2,744,420

CABLE SLACK COMPENSATOR

John D. Pigford, Los Angeles, Calif., assignor to Northrop Aircraft, Inc., Hawthorne, Calif., a corporation of California Application July 11, 1952, Serial No. 298,229

1 Claim. (Cl. 74—501.5)

This invention relates to cable control systems for operating full power controls in airplanes and more particularly to cable control systems in airplanes employing power-operated control surfaces in which the power actuator is controlled both manually and by an auto-pilot servo-motor.

In airplanes having power-operated control surfaces, in which the valve controlling flow of hydraulic fluid to the hydraulic power actuator is operated both manually and by an auto-pilot servo, it is important that the auto-pilot servo be placed as close to the actuator and its valve as possible, as this arrangement reduces lost motion to a minimum.

Also, in an airplane employing power-operated control surfaces, it is desirable to provide a control force producer to provide a synthetic "feel" to simulate conventional piloting procedures when the valve controlling flow of hydraulic fluid to the power actuator is manually controlled. Such a control force producer, to provide this synthetic "feel" or feed-back force, is disclosed in U. S. Patent No. 2,597,769, and is customarily placed close to the stick or control column of the airplane.

In an airplane, which is rigged as described above, namely, having attitude control surfaces which are full power controlled, the power actuator being actuated manually and by an auto-pilot servo located adjacent the actuator which it serves and also employing a control force producer adjacent the control column, the auto-pilot servo will not only provide power to actuate the valve controlling flow of hydraulic fluid to the actuator, but will also provide power, through the airplane's cable control system, to overcome the force of the control force producer which force tends to return the pilot's stick to its neutral position. This places a force in one cable carrying the load which can exceed twice the force at which it is normally rigged to operate, and causes a slackening to occur in the other or "no-load" cable.

Such a slackening of the "no-load" cable is objectional, as it may not track properly upon its various guiding pulleys, and further may become fouled on some part of the airplane rendering the control cable and the control surface which it controls inoperative.

Therefore, it is an object of this invention to provide, in the system herein being discussed, simple and effective means such as slack compensators for absorbing any slack which may occur in the "no-load" cable of the cable control system of an airplane in order that it will track properly and also not become fouled on any of the other parts of the airplane.

Other objects of this invention will be apparent or will be specifically pointed out in the description forming a part of this specification, but the invention is not to be limited to the embodiments herein described, as various forms may be adopted within the scope of the appended claim.

The invention may be more fully understood by reference to the accompanying drawings, wherein:

Figure 1 is a diagrammatic perspective view of an airplane showing an elevator cable control system embodying the present invention.

Figure 2 is a side elevational view of a slack compensator used in the system shown in Figure 1, partly in section to show its construction.

Figure 3 is a side elevational view of the slack compensator partially cut away to show the device in its fully extended or rigged position.

Figure 4 is a fragmentary sectional view of one connecting end of the device of Figures 2 and 3, taken as indicated by the line 4—4 of Figure 2.

Figure 5 is a fragmentary sectional view of one connecting end of the device of Figures 2 and 3, taken as indicated by the line 5—5 of Figure 2.

Referring first to Figure 1 for a detailed description of this invention, an airplane 1 has two elevators 2 and 3 operated as a single unit by two cable-controlled hydraulic actuators 4, 4. Each actuator is connected by two control cables 5, 5 to a double control quadrant 6 located beneath the floor of the cockpit 7. The double quadrant 6 is fixed to an output shaft 8 of a force producer assembly 9 which includes a stick attachment 10 to carry a control stick 11 for conventional operation of the elevators 2 and 3. The slack compensators 12, as shown in Figure 1, are located in the cable system controlling the elevators 2 and 3, but they may also be installed in the cable systems controlling the other control surfaces of the airplane. The manual control cables 5, 5 and the auto-pilot servo cables 13 and 14 are connected to control quadrants 15, 15 and 16, respectively, in such a manner that any movement of the manually operated or auto-pilot cables will produce a corresponding movement in the other set of cables as all quadrants 15, 15 and 16 are keyed to shaft 17.

Although two sets of manually operated cables 5, 5 are shown in Figure 1, their function is identical and, therefore, only the function of one set will be described.

The control cables 5, 5 are rigged in one preferred system in such a manner that there is a tension of approximately 17 lbs. exerted in these cables under normal operating conditions. When the elevator surfaces are being actuated by the auto-pilot servo, a load exceeding twice the above amount is developed in the cable carrying the load due to the additional force required to overcome the force of the force producer 9. This additional pull or force in the cable 5 carrying the load allows the other or "no-load" cable 5 to become slack and it is the purpose of the slack compensator to remove or absorb this slack so that the "no-load" cable will track properly and not become fouled.

The slack compensator 12 is constructed as shown in Figures 2 to 5, inclusive, and consists of two telescoping tube members 18 and 19, a spring 20a surrounds both of the telescoping tube members and is secured near the tube ends 20 and 21. Cup elements 22 and 23 are provided for securing the control cables to the tube members. The tube member 19 has a portion 24 of less inside diameter than the remainder of its inside diameter which provides a bearing surface for tube 18 and also a shoulder 25 which functions as a stop for tube 18 as presently described. The outside diameter of tube 18 is constant throughout, except for annular shoulder 26, being such as to provide a sliding fit with the portion 24 of tube 19. The end portion of tube 18 is formed with an annular shoulder 26. The diameter of shoulder 26 being such as to permit free travel within that portion of tube 19 having the larger inside diameter but contacting shoulder 25 to limit the travel of tubes 18 and 19 in their full extended position as shown in Figure 3. The non-telescoping end portions are provided with diametrically opposite slots 27 and 28 extending longitudinally a short distance from the non-telescoping end. In the assembled position the spring surrounds tubes 18 and 19 with its end portions positioned in slots 27 and 28 as shown in Figures 4 and 5. The non-telescoping end portions of tubes 18 and 19 are also externally threaded. Cup elements 22 and 23 are internally threaded and secured thereby to the end portions of tubes 18 and 19 respectively. Cup element 22 is provided with diametrically opposite apertures 31, 31 and a radial slot 32 extending from one of the apertures 31 through its wall and base portion as shown in Figure 5. The cup member 23 is constructed in an identical manner as cup 22. The ends of cables 5, 5 are provided with ball connections 33 which detachably secure the cables to cup elements 22 and 23, in a conventional manner, as shown in Figures 4 and 5. It should be noted that cup members 22 and 23 retain the ends of spring 20a in their respective slots 27 and 28.

In its assembled position in the cable control system of an airplane, as shown in Figure 1, the slack compensator is in its extended or bottomed position, as shown in Figure 3. The force exerted by the spring in its extended position must not exceed the rigged force in the cable control system which in the preferred case is approximately 17 lbs. When the control surface actuator is manually operated, the slack compensator in both cables will remain in its "bottomed" position, as shown in Figure 3, as the force required to actuate the control valve will not exceed 4 lbs. However, when the control surface actuator is actuated by the auto-pilot servo an additional load is placed on one of the control cables which will equal or exceed the force exerted by the force producer 9. This force will exceed twice the normal rigged force in the cable carrying the load and result in a slacking condition of the "no-load" cable. It is this slack in the "no-load" cable which the slack compensator absorbs.

From the above description it will be apparent that there is thus provided a system of the character described which will effectively absorb any slack occuring in the "no-load" cable of any cable control system having a actuators at each end thereof. Obviously, the system of the present invention is susceptible of modification in its form, proportions, detail construction and arrangement of parts as will be apparent to anyone skilled in the art.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claim.

What is claimed is:

In a cable control system including a control element, a responsive element spaced therefrom, and a pair of cables attached to and extending between said elements and rigged under a predetermined initial tension for transmitting movements of the control element to the responsive element, the combination of an extensible and contractible slack compensator connected into each of the cables and comprising a pair of elongated telescoping members having interengaging abutments thereon to limit extension of said compensator, and a spring engaged with said members for urging said compensator to contract, the force exerted by said spring in the fully extended position of said compensator being less than the initial rigging tension of the cables, whereby said compensator is fully extended under the initial rigging tension.

References Cited in the file of this patent

UNITED STATES PATENTS

| | | |
|---|---|---|
| 1,159,720 | Simpson | Nov. 9, 1915 |
| 1,561,897 | Allcutt et al. | Nov. 17, 1925 |
| 1,671,081 | Miller | May 22, 1928 |
| 2,122,442 | Segal | July 5, 1938 |
| 2,140,037 | Swisher | Dec. 13, 1938 |
| 2,298,611 | Bruderlin | Oct. 13, 1942 |
| 2,396,951 | Horstmann | Mar. 19, 1946 |
| 2,424,198 | Tauscher | July 15, 1947 |
| 2,445,343 | Tyra | July 20, 1948 |
| 2,604,657 | Tipper | July 29, 1952 |

FOREIGN PATENTS

| | | |
|---|---|---|
| 321,851 | Great Britain | Oct. 2, 1929 |